(12) United States Patent
Karlander

(10) Patent No.: US 7,357,430 B2
(45) Date of Patent: Apr. 15, 2008

(54) BUMPER BEAM FOR A VEHICLE

(75) Inventor: Lars Karlander, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 38 days.

(21) Appl. No.: 11/292,420

(22) Filed: Dec. 2, 2005

(65) Prior Publication Data

US 2006/0071485 A1    Apr. 6, 2006

Related U.S. Application Data

(63) Continuation-in-part of application No. PCT/SE2004/000842, filed on Jun. 2, 2004.

(30) Foreign Application Priority Data

Jun. 6, 2003    (SE) .................................... 0301641

(51) Int. Cl.
*B60R 19/02* (2006.01)

(52) U.S. Cl. .................................................... 293/102

(58) Field of Classification Search ................ 296/102; 293/102
See application file for complete search history.

(56) References Cited

U.S. PATENT DOCUMENTS

| 5,997,058 | A  | * | 12/1999 | Pedersen ..................... 293/102 |
| 6,343,820 | B1 | * | 2/2002  | Pedersen ..................... 293/102 |
| 2004/0007886 | A1 | * | 1/2004 | Hallergren .................. 293/102 |

FOREIGN PATENT DOCUMENTS

| WO | 9747496 | 12/1997 |
| WO | 9915365 | 4/1999 |
| WO | 0066400 | 11/2000 |
| WO | 0078575 | 12/2000 |
| WO | 0230714 | 4/2002 |

* cited by examiner

*Primary Examiner*—Dennis H Pedder
(74) *Attorney, Agent, or Firm*—Mark P. Stone

(57) ABSTRACT

A bumper beam for a vehicle in the form of a hat beam is adapted to be mounted with its opening facing outwards from the vehicle. The beam has a web height that varies along the beam. The web height in portions (25, 26) between a central portion (24) and fastening portions (18, 19) on each side of the central portion has a reduce web height as compared with both the central portion and the side portions.

13 Claims, 2 Drawing Sheets

BUMPER BEAM FOR A VEHICLE

This is a continuation-in-part of International Application PCT/SE2004/000842, with an international filing date of Jun. 2, 2004.

TECHNICAL FIELD

This invention relates to a bumper beam for a vehicle in the form of a hat beam adapted to be mounted with its opening facing outwards from the vehicle.

TECHNICAL BACKGROUND

Usually, one wants to make bumper beams as stiff as possible so that their collapsing is delayed when they hit a barrier. In particular for a rear bumper, one of the most common accidents is however a vehicle backing onto a narrow pole on a parking lot. A bumper beam that, in a backing accident, is strong when hitting a barrier may not yield when hitting a narrow pole close to the centre of the vehicle. It will instead fold and collapse completely. WO 00/66400 shows a bumper beam in the form of a hat beam that has its web height reduced towards its centre.

OBJECT OF INVENTION AND BRIEF DESCRIPTION OF THE INVENTION

It is an object of the invention to provide a bumper beam that is optimally adapted to take up energy well at various kinds of collisions.

This is achieved primarily in that the webs of the beam in portions between a central portion and side portions on both sides of the central portion have a reduced height as compared with both the central portion and the side portions.

BRIEF DESCRIPTION OF THE DRAWINGS

The figures show a bumper beam that is only an example of the invention.

DESCRIPTION OF THE ILLUSTRATED AND PREFERRED EMBODIMENT

Figure 1:
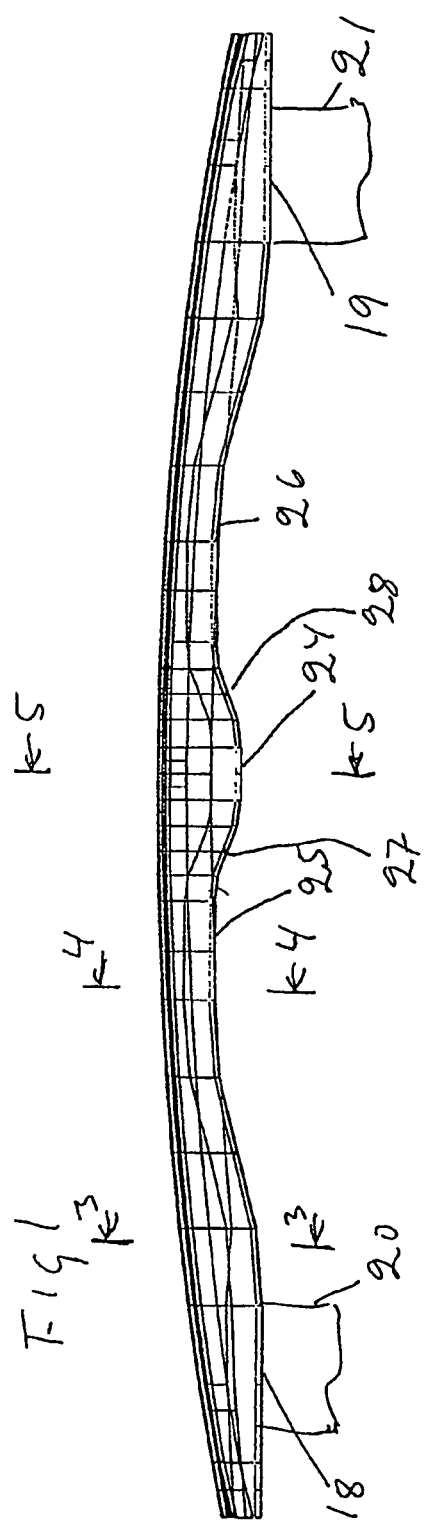
FIG. 1 is a computer-drawn view of the bumper beam seen from above.
Figure 2:
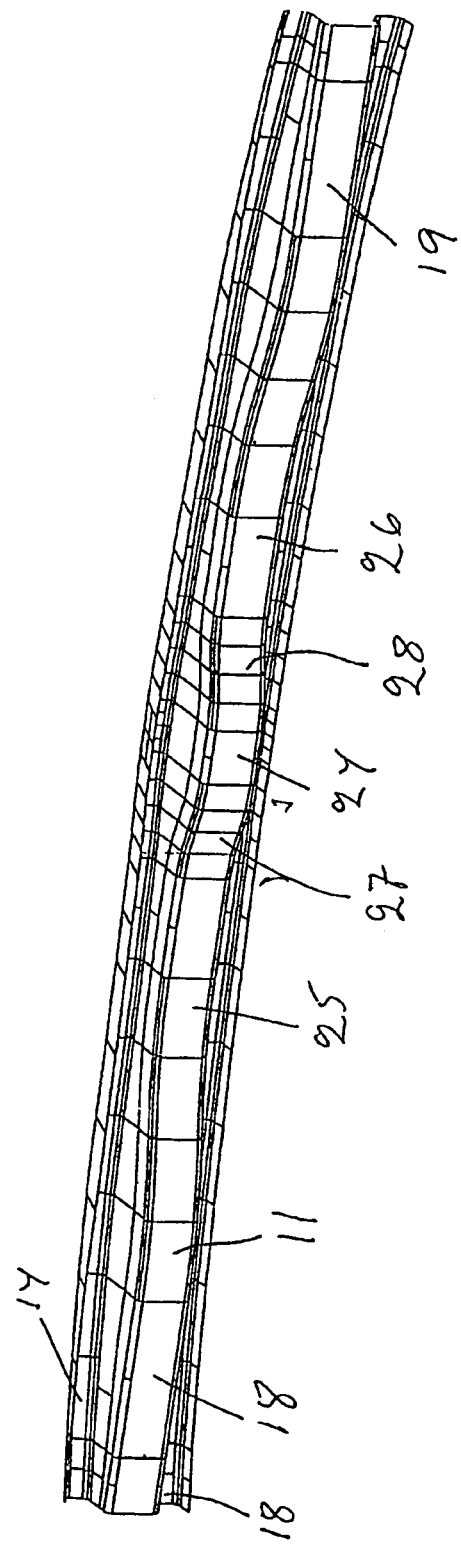
FIG. 2 is a computer-drawn perspective view of the bumper beam shown in FIG. 1.
Figure 5:
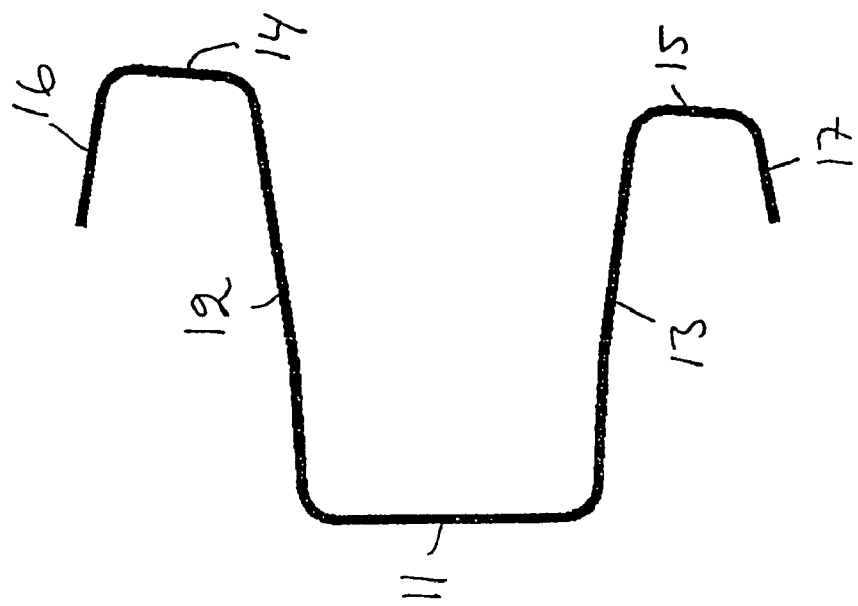
FIGS. 3, 4 and 5 are transverse sections taken along the respective lines 3-3, 4-4 and 5-5.
Figure 4:
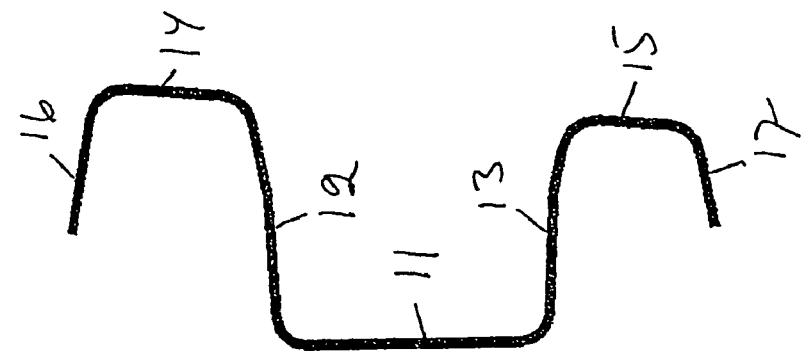
Figure 3:
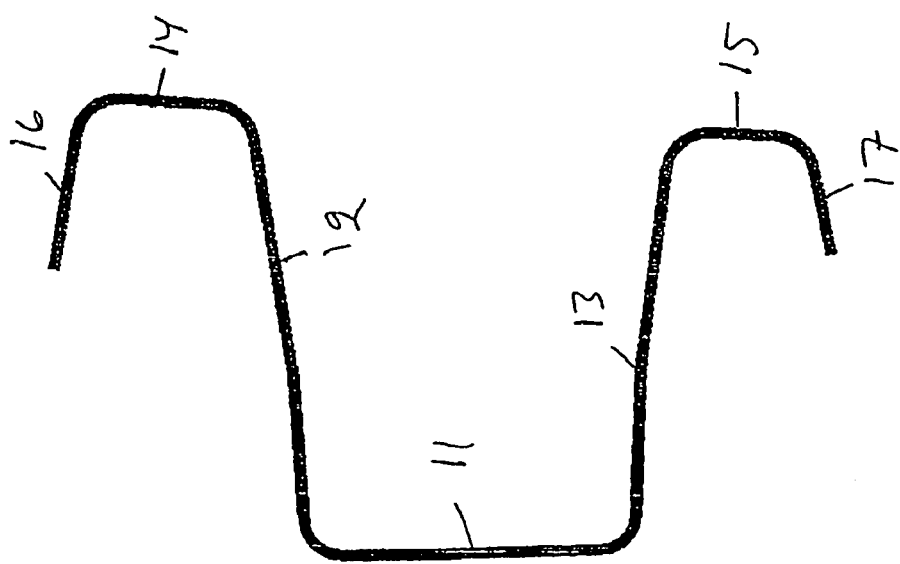

The bumper beam shown on the figures is made of metal. It can suitably be made of hardenable sheet steel that is hot-stamped and hardened in a single step in the so called press-hardening process. The high-strength steel may have a yield strength over 1200 MPa (N/mm$^2$) or over 1500 MPa.

The bumper beam is a hat beam (it has a hat profile) with a central flange 11, two webs 12,13 and two side flanges 14,15. The side flanges have upstanding edges 16,17. The beam has two fastening portions 18,19 in one and the same plane. These fastening portions are fastened to supporting parts 20,21 of the vehicle. The webs 12,13, and thus the profile height of the beam, are high in the central portion 24 of the beam and in connection with the fastening portions 18,19, but they are considerably lower In the portions 25,26 therebetween. The web height in the portions with reduced height 25,26 should be at most ¾, rather 213 or preferably at most half of the web height at the central portion 24. Each one of the transitions 27,28 between the central portion and the height-reduced portions has a length that is at most ¹⁄₁₀ of the total length of the beam. Thereby, the central flange will have rather abrupt bends and these bends will stabilise the webs and reduce their tendency to bend outwardly away from each other when the beam is loaded close to it centre.

Preferably, the total length of the central portion 24 and the two transition portions 27, 28 disposed to the sides of the central portion 24, will not exceed more than one third the length of the beam.

The illustrated beam has thus a central portion and portions in connection with the fastening of the beam, all of which are strong and between these portions are weaker portions.

Buckling of the beam causes more damage the closer to the middle it is since the longest moment arm will be there. If the profile is strong and does not bend, a thin pole will buckle the beam to a sudden collapse. If the profile is more yielding by having the weakened portions 25, 26, a buckling is delayed when the beam is hit close to its midpoint.

The beam will have somewhat impaired qualities in collisions with a barrier because of its yieldability but the invention will provide an optimum compromise between the qualities for various kinds of crashes and better overall qualities.

The described beam is made of hot stamped and hardened sheet steel, suitably boron alloyed manganese steel. Alternatively, it can be cold formed of high strength cold forming steel. It can also be made of another metal than sheet steel, for example aluminum.

The invention claimed is:

1. A bumper beam for a vehicle in the form of a hat beam adapted to be mounted with its opening facing outwards from the vehicle, characterized in that the webs of the beam in reduced portions (25, 26) between a central portion (24) and fastening portions (18, 19) on both sides of the central portion have a reduced height as compared with both the central portion and the fastening portions, in that the height of the webs in the reduced portions is at most ¾ of the height of the webs at the central portion (24), and in that said bumper beam includes transition portions (27, 28) between the central portion (24) and the reduced portions (25, 26), each of the transition portions having a length that is at most ¹⁄₁₀ of the total length of the beam.

2. A bumper beam according to claim 1, characterised in that the height of the webs in the reduced portions (25, 26) is at most ⅔ of the height of the webs at the central portion (24).

3. A bumper beam according to claim 2, characterised in that the height of the webs in the reduced portions (25, 26) is at most ½ of the height of the webs at the central portion (24).

4. A bumper beam for a vehicle in the form of a hat beam adapted to be mounted with its opening facing outwards from the vehicle, characterised in that the webs of the beam in reduced portions (25, 26) between a central portion (24) and fastening portions (18, 19) on both sides of the central portion have a reduced height as compared with both the central portion and the fastening portions, in that the height of the webs in the reduced portions is at most ¾ of the height of the webs at the central portion (24), and in that said bumper beam includes transition portions (27, 28) between the central portion (24) and the reduced portions (25, 26), each of the transition portions having a length that is at most ¹⁄₁₀ of the total length of the beam, wherein the total length of the transition portions (27, 28) and the central portion (24) does not exceed ⅓ of the total length of the beam.

5. A bumper beam according to claim 2, wherein the total length of the transition portions (27, 28) and the central portion (24) does not exceed ⅓ of the total length of the beam.

6. A bumper beam according to claim 3, wherein the total length of the transition portions (27, 28) and the central portion (24) does not exceed ⅓ of the total length of the beam.

7. A bumper beam for a vehicle in the form of a hat beam adapted to be mounted with its opening facing outwards from the vehicle, characterised in that the webs of the beam in reduced portions (25, 26) between a central portion (24) and fastening portions (18, 19) on both sides of the central portion have a reduced height as compared with both the central portion and the fastening portions, and that the total length of transition portions (27, 28) disposed to the sides of the central portion (24) and the central portion (24) does not exceed ⅓ of the total length of the beam.

8. A bumper beam according to claim 7 characterised in that the height of the webs in the reduced portions is at most ¾ of the height of the webs at the central portion.

9. A bumper beam according to claim 8, characterised in that the height of the webs in the reduced portions (25, 26) is at most ⅔ of the height of the webs at the central portion.

10. A bumper beam according to claim 9, characterised in that the height of the webs in the reduced portions (25, 26) is at most ½ of the height of the webs at the central portion (24).

11. A bumper beam according to claim 7, characterised in that each one of the transition portions (27, 28) between the central portion (24) and the reduced portions (25, 26) has a length that is at most 1/10 of the total length of the beam.

12. A bumper beam according to claim 9, characterised in that each one of the transition portions (27, 28) between the central portion (24) and the reduced portions (25, 26) has a length that is at most 1/10 of the total length of the beam.

13. A bumper beam according to claim 10, characterised in that each one of the transition portions (27, 28) between the central portion (24) and the reduced portions (25, 26) has a length that is at most 1/10 of the total length of the beam.

* * * * *